United States Patent
Carlsson et al.

[11] 3,891,768
[45] June 24, 1975

[54] TREATMENT OF PARKINSON'S DISEASE

[75] Inventors: Per Arvid Emil Carlsson, Grotenborg; Hans Rudolf Corrodi, Askim, both of Sweden

[73] Assignee: Aktiebolaget Hassle, Goteborg, Sweden

[22] Filed: Aug. 20, 1973

[21] Appl. No.: 390,126

Related U.S. Application Data

[63] Continuation-in-part of Ser. No. 387,370, Aug. 10, 1973, abandoned, and Ser. No. 190,682, Oct. 19, 1971, abandoned.

[52] U.S. Cl. .............. 424/309; 424/319; 424/324; 424/327
[51] Int. Cl. ............................................ A61k 27/00
[58] Field of Search .......... 424/319, 308, 309, 327, 424/324

[56] References Cited
UNITED STATES PATENTS

| | | | |
|---|---|---|---|
| 3,344,023 | 9/1967 | Reinhold | 424/317 |
| 3,462,536 | 8/1969 | Chemerda et al. | 424/309 |
| 3,646,213 | 2/1972 | Bartholini | 424/319 |
| 3,658,968 | 4/1972 | Lotti | 424/317 |

FOREIGN PATENTS OR APPLICATIONS

| | | |
|---|---|---|
| 5,222 | 1/1966 | France |

*Primary Examiner*—Stanley J. Friedman
*Attorney, Agent, or Firm*—Brumbaugh, Graves, Donohue & Raymond

[57] ABSTRACT

A method for the treatment of symptoms of Parkinson's disease in animal subjects, including man, wherein there is administered a therapeutically effective amount of at least one ester of dl- or L-m-tyrosine of the formula

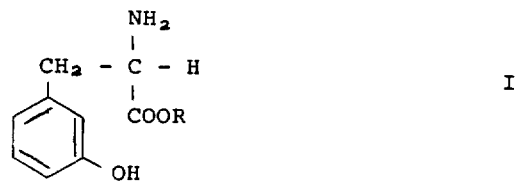

I wherein R denotes a lower, straight or branched alkyl having one to three carbon atoms in the form of a base or a pharmaceutically acceptable acid. Said ester is administered by itself with at least one of the compounds s,4-dihydroxyphenyl-$\alpha$-methyl-$\alpha$-hydrazino-propionic acid (II) or $N^1$-seryl-$N^2$-(2,3,4-trihydroxybenzyl)-hydrazine (III) in an amount sufficient to potentiate the effectiveness of said ester. Compounds II and III may be used either concurrently with or prior to treatment with compound I.

29 Claims, No Drawings

TREATMENT OF PARKINSON'S DISEASE

This is a continuation-in-part of applications Ser. Nos. 387,370, pending, and 190,682 now abandoned, filed Aug. 10, 1973 and Oct. 19, 1971 respectively.

The present invention relates to a method for the treatment of symptoms of Parkinson's disease in animal subjects, including man, by means of meta-tyrosine esters or a combination of meta-tyrosine esters and hydrazine derivatives, as well as pharmaceutical preparations containing said esters or said combinations.

The present invention results in a reduced incidence of side-effects from the active substance.

It is previously known that the amino acid L-dopa is a therapeutically active compound against certain symptoms of Parkinson's disease such as rigidity, akinesia, mental depression and is commonly used for treatment of this condition. Its therapeutic effect has been described by W. Birkmayer and O. Hornkiewicz, Archivfuer Psychiatrie and Zeitscrift fuer die gesamte neurologie, 203, 560–574, (1962); by G. C. Cotzias, P. S. Papavasilion and R. Gellene, New England J. Med., 280 337–345, (1969); Medical Letter, 11, 73–75, (1969).

However, the treatment with L-dopa causes several undesirable side effects of which nausea, vomiting, hypotension, psychoses and decreased absorption from the intestines of the natural amino acid L-tyrosine leading to hypotyrosinemia have been described.

It is also known from W. Birkmayer, Wiener Zeitschrift fuer Nervenheilkunde und deren Grenzgebiete, 18, 369–386, (1966), that, unlike L-dopa, the amino acid meta-tyrosine has no effect on patients suffering from Parkinson's disease.

It has now surprisingly been found possible to alleviate the symptoms of rigidity and akinesia in patients with Parkinson's disease by administering a therapeutically active amount of esters of dl- and L-meta-tyrosine of the general formula

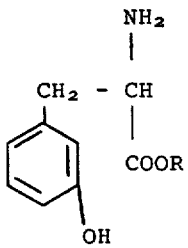

in which R denotes a lower, straight or branched alkyl group having one to three carbon atoms, as base or as salts of pharmaceutically acceptable acids.

Examples of compounds which are used according to the present invention are:
dl-m-tyrosine methyl ester
dl-m-tyrosine ethyl ester
dl-m-tyrosine propyl ester
dl-m-tyrosine isopropyl ester
L-m-tyrosine methyl ester
L-m-tyrosine ethyl ester
L-m-tyrosine propyl ester
L-m-tyrosine isopropyl ester These new compounds are prepared by any of several reaction schemes:

A. Direct esterification of the corresponding tyrosine:

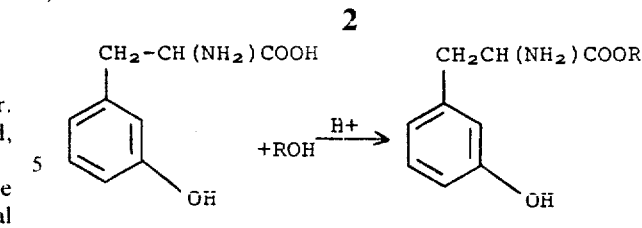

in which R has the meaning given above.

The reaction may also preferably be carried in the presence of thionyl chloride ($SOCl_2$) or dicyclohexlcarbodiimide, $(C_6H_{11}N)_2C$. This method is effective for preparing the racemate and also the L-form.

B. Hydrogenation of halogenated tyrosine esters:

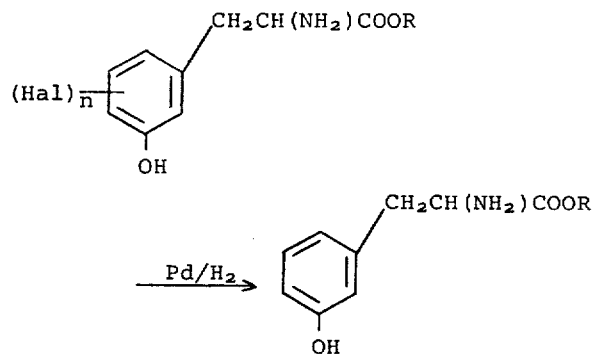

where Hal denotes Cl, Br, or I, $n$ is 1 to 4 and R has the meaning given above, a dehalogenation of mono- or polyhalogenated esters of dl- or L-m-tyrosine takes place.

C. Hydrogenation of corresponding O-aralkylethers:

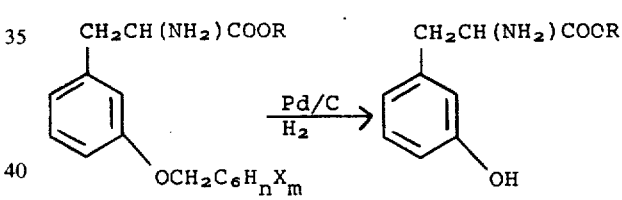

in which R has the meaning given above, X denotes H or lower alkyl, $n + m$ is 5, a hydrogenation of O-aralkylethers of esters of dl- or L-m-tyrosine takes place.

The compounds according to the invention exist in the form of optically active enantiomers which may be isolated in any manner known for the resolution of an amine.

The racemate obtained according to the reactions mentioned above may be resolved in its enantiomers by transforming the free base to a salt or an amide of an optically active acid such as tartaric acid, camphorsulfonic acid, bromocamphorsulfonic acid, malic acid or any other optically active acid which may form crystalline salts with the amine, and recovering the amine after the usual separation of the diastereomeric mixture thus obtained.

The new compounds according to the invention may be administered in the form of salts of physiologically acceptable acids. Suitable acids, which may be used are hydrochloric acid, hydrobromic acid, sulphuric acid, phosphoric acid, fumaric acid, citric acid, tartaric acid, maleic acid or succinic acid.

It has also turned out that certain compounds are able to potentiate the effects of esters of dl- and L-m-tyrosine. Such compounds are 3,4-dihydroxyphenyl-α- methyl-α-hydrazino propionic acid having the formula

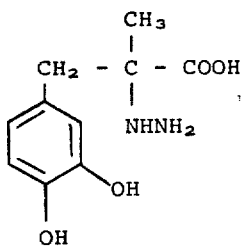

and N¹-seryl-N²-(2,3,4-trihydroxybenzyl)-hydrazine having the formula

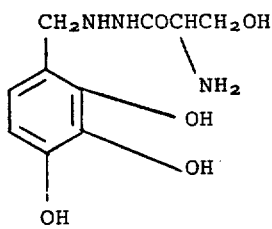

When such compounds are given concurrently or up to 6 hours preferably up to 4 hours prior to the administration of the esters the dose of dl- or L-m-tyrosine esters can be considerably reduced, which makes the treatment less expensive and causes less side effects such as nausea and vomiting.

By administering 100-2,000 mg per day of these compounds or preferably 750-1,500 mg of the compound II or 200-1,000 mg of the compound III per day thus the doses, which are necessary to relieve Parkinson symptoms, may be reduced from 3-6 g per day (of L-m-tyrosine ethylester) to 0.5-2.0 g per day or as low as to 0.5-1.0 g per day.

Further the invention relates to pharmaceutical compositions containing as active ingredient at least one of the m-tyrosine esters and to pharmaceutical compositions containing as active ingredient at least one of the m-tyrosine esters and at least one of the hydrazine derivatives according to the invention together with a pharmaceutical carrier. Such compositions may be prepared for oral, rectal or parenteral administration.

To produce a pharmaceutical preparation, in the form of dosage units for oral administration, the active ingredient in the form of a base or a pharmaceutically acceptable salt, may be mixed with a solid pulverulent carrier, for example, lactose, saccharose, sorbitol, mannitol, starch, such as potato starch, corn starch, amylopectin, cellulose derivatives or gelatin and may also include a lubricant such as magnesium or calcium stearate or a Carbowax or other polyethylene glycol wax, the final mixture being compressed to form tablets or cores for coating. When coated tablets are required, the cores may be coated with a concentrated sugar solution which may contain, for example, gum arabic, talcum and/or titanium dioxide. Alternatively, the tablets may be coated with a lacquer dissolved in a volatile organic solvent or a mixture of organic solvents. Dyestuffs may be added to these coatings. For the preparation of soft gelatine capsules (pearl-shaped, closed capsules) consisting of gelatine and, for example, glycerol and similar closed capsules, the active substance may be admixed with a Carbowax. Hard gelatine capsules may contain granulates of the active substance in combination with solid pulverulent carriers such as lactose, saccharose, mannitol, starches (e.g., potato starch, cornstarch or amylopectin), cellulose derivatives or gelatine and may also contain magnesium stearate or stearic acid. Dosage units for rectal administration may comprise suppositories comprising the active compound in admixture with a neutral fatty base or gelatine-rectal capsules comprising the active compound in admixture with a Carbowax or other polyethylene glycol waxes. Each dosage unit preferably contains 1 to 500 mg of the active ingredient and the potentiating agent in the relations given above.

Liquid preparations for oral administration may be in the form of syrups, suspensions or emulsions, for example, containing from about 0.1 to about 20 percent by weight of the active compound and the potentiating agent in the relations given above and also, if required, additives such as stabilizing agents, suspension agents, dispersion agents, flavoring agents and/or sweetening agents.

Liquid preparations for rectal administration may be in the form of aqueous solutions containing from about 0.1 to 10 percent by weight of the active compound and the potentiating agent in the relations given above and also, if required, stabilizing agents and/or buffering agents.

For parenteral administration by means of injections the carrier may be a sterile, parenterally acceptable liquid such as pyrogen-free water or an aqueous solution of polyvinylpyrrolidone or a parenterally acceptable oil such as arachis oil, and if desired, a stabilizing agent and/or buffering agent. For convenience, it might be advantageous to enclose the dosage units of the solution in ampoules.

The dosage amount for one patient depends upon the active compound used, the manner of administration and the desired therapeutic effect. Generally, the dose varies from 1.25 mg to about 125 mg per kilo of the body weight when the esters and the hydrazine derivatives are administered intravenously, or from 10 to 150 mg per kilo body weight, when the esters and the hydrazine derivatives are administered orally in one dose.

The present invention will be described below with reference to the following examples without being limited thereto.

EXAMPLE 1

10 g of dl-m-tyrosine were suspended in 100 ml of methanol, which was saturated with HCl-gas. After 12 hours refluxing, the solvent was removed by evaporation, whereupon the residue, 12.7 g of dl-m-tyrosine methyl ester hydrochloride, was crystallized from ethyl acetate. Melting point 180° C.

EXAMPLE 2

10 g of dl-m-tyrosine were suspended in 100 ml of ethanol, which was saturated with HCl-gas. After 12 hours refluxing, the solvent was removed by evaporation, whereupon the residue, 13.5 g of dl-m-tyrosine ethyl ester hydrochloride, did not crystallize. The hydrochloride of the ethyl ester was thereafter converted in a known way to free base. Thereby 11.5 g of dl-m-tyrosine ethyl ester were obtained a having a melting point of 121° C.

EXAMPLE 3

10 ml of thionylchloride were added to 10 g of dl-m-tyrosine in 100 ml of methanol during ice cooling. After 2 hours at 0° C, the solvent was evaporated and the residue, 12.7 g of dl-m-tyrosine methyl ester hydrochloride, was recrystallized from ethyl acetate. Melting point 180° C.

The ethyl-, propyl- and isopropyl esters of dl-m-tyrosine are prepared in the same way.

EXAMPLE 4

13 g of dicylohexyl carbodiimide was added to 10 g of dl-m-tyrosine suspended in 100 ml of ethanol. After several hours at 20° C, water was added, and the ester formed was extracted three times with ether or ethyl acetate. After evaporation of the solvent, the free base of dl-m-tyrosine ethyl ester was obtained in an amount of 11.5 g of base having a melting point of 121° C. In the corresponding way, the methyl-, propyl- and isopropyl esters of dl-m-tyrosine may be prepared.

EXAMPLE 5

10 g of L-m-tyrosine suspended in 100 ml of methanol were saturated with HCl-gas. After 12 hours refluxing, the methanol was removed by evaporation, whereupon the residue, 12 g of L-m-tyrosine methyl ester hydrochloride, was crystallized from ethyl acetate. Melting point 205° C. $[\alpha]_{365}^{25} = +83.7°$ (C = 2, EtOH).

EXAMPLE 6

10 g of L-m-tyrosine suspended in 100 ml of ethanol were saturated with HCl-gas. After 12 hours refluxing, the ethanol was removed by evaporation. The residue, 13.5 g L-m-tyrosine ethyl ester hydrochloride, was converted to free base in a manner known per se. The rotation of the L-form was $[\alpha]_D^{20} -4.95° C = 4,1$. N HCL); $[\alpha]_D^{20} = + 16.52°$ (C = 2, EtOH); $[\alpha]_{365}^{20} = +3.18°$ (C = 4,1. N HCL); $[\alpha]_{365}^{20} = +70.70°$ (C = 2, EtOH).

In the corresponding way, L-m-tyrosine propyl and isopropyl esters are prepared.

EXAMPLE 7

2.88 g of dl-4-bromo-3-hydroxy phenyl alanine ethyl ester dissolved in 30 ml of ethanol were hydrogenated catalytically in the presence of 0.5 g Pd on carbon. After absorption of 0.01 moles of $H_2$, the mixture was filtered, the solvent evaporated, and the precipitated hydrobromide of dl-m-tyrosine ethyl ester was converted to the free base having a melting point of 121° C.

EXAMPLE 8

5 g (0.016 moles) of dl-3-benzyloxy phenyl alanine ethyl ester dissolved in 50 ml of ethanol was hydrogenated catalytically in the presence of 0.5 g Pd-C catalyst. The reaction stopped after absorption of an equivalent amount of $H_2$ (0.016 moles). After filtration and evaporation in vacuo, 3.2 g of dl-m-tyrosine ethyl ester were obtained. Melting point 121° C.

EXAMPLE 9

4.3 g of dl-m-tyrosine methyl ester in 50 ml of methanol were treated with 7.2 g of D-tartaric acid. After several hours, the crystals formed were sucked off and then were recrystallized from methanol-ethyl acetate. Thereafter the product was converted to the hydrochloride $[\alpha]_{365}^{25} = +83.7°$ (C = 2, EtOH) in a known way.

In a corresponding way, dl-m-tyrosine ethyl ester, dl-m-tyrosine isopropyl ester and dl-m-tyrosine propyl ester were resolved to L-m-tyrosine ethyl ester, $[\alpha]_{365}^{25} = +70.70°$ (C = 2, EtOH), L-m-tyrosine isopropyl ester and L-m-tyrosine propyl ester [M.P. 99° to 101° C; $[\alpha]_{365}^{25} = +103.0°$ (C = 1, EtOH)], respectively.

The compounds according to the present invention have therapeutical properties of great value, which refer to their alleviation of the symptons of Parkinson's disease.

The following experiments, which are good animal models for Parkinson's disease have been carried out in order to establish and compare the therapeutic effect of the various compositions.

EXAMPLE 10

Blockade of reserpine induced katatonia

In a first series, mice were injected i.p. with 5 mg of reserpine per kilo of the body weight. After a short while, this induced a syndrome characterized by rigidity, akinesia in the muscles and katatonia, which syndrome resembles the clinically seen picture of Parkinson's disease.

Thereafter, by administering compounds which are able to stimulate the dopamine receptors of the brain, this katatonia is reversed.

L-dopa, L-m-tyrosine ethyl ester and L-m-tyrosine methyl ester were equipotent according to this test in doses of 300 to 400 mg per kilo of the body weight injected i.p. The esters of L-m-tyrosine, however, gave a longer duration of the blockade of this katatonia (60 min, contrary to L-dopa, which blocks for 30 min with the same dose). The dl-m-tyrosine esters have, however, half the activity in relation to the L-m-tryosine esters due to the fact that the D-m-tyrosine esters are inactive.

EXAMPLE 11

Rotation in rats with unilateral lesion in the nigro-neostriatel dopamine neurons Male rats were injected unilaterally in the substantia nigra with 6-hydroxy-dopamine, whereby the dopaminergic nigro-neostriatel neurons degenerate. (The technique is previously described by U. Ungerstedt in European Jour. of Pharmacol. 5, 107 (1968).) After 2 months, these animals become unilaterally supersensitive to cerebrally active dopamine receptor stimulating compounds. When in such cases such a dopaminergic compound is administered, the animal starts to rotate around itself away from the injured side. The rotation frequency and the duration can easily be measured.

In this test, commonly used antiparkinson agents show a characteristic result.

The result of such a test is given in Table 1 below.

Table 1

| Compound | Dose mg/kg body-weight i.p. | Rotation-frequency $min^{-1}$ | Duration min |
|---|---|---|---|
| L-dopa | 100 | 10–20 | 60 |
| L-m-tyrosine ethyl ester | 100 | 10–20 | 60 |
| L-m-tyrosine methyl ester | 100 | 10–20 | 60 |

Table 1

| Compound | Dose mg/kg i.p. | Rotation Frequency (min⁻¹) | Rotation Duration (min) |
|---|---|---|---|
| L-dopa | 100 | 10–20 | 120–180 |
| L-m-tyrosine ethylester | 100 | 10–20 | 180–360 |
| dl-m-tyrosine ethylester | 200 | 10–20 | 180–360 |
| Compound II + L-m-tyrosine ethylester | 10<br>50 | 8–12 | 180 |
| Compound II + L-m-tyrosine ethylester | 100<br>50 | 10–20 | 180–360 |
| Compound III + L-m-tyrosine ethylester | 10<br>50 | 8–12 | 180 |
| Compound III + L-m-tyrosine ethylester | 100<br>50 | 10–20 | 180–360 |

Table 1-Continued

| Compound | Dose mg/kg body-weight i.p. | Rotation-frequency min⁻¹ | Duration min |
|---|---|---|---|
| dl-m-tyrosine ethyl ester | 200 | 10–20 | 60 |
| dl-m-tyrosine methyl ester | 200 | 10–20 | 60 |
| α-methyl tyrosine methyl ester | 500 | no effect deeply sedated | — |
| 3, α-dimethyl tyrosine ethyl ester | 1000 | no effect deeply sedated | — |

Thus, also in this test, the L-m-tyrosine esters are equipotent to L-dopa. The dl-m-tyrosine esters have, according to the tests, half the activity for the reason previously given. As evident from the table above, the structurally similar compounds α-methyl tyrosine methyl ester and 3,α-dimethyl tyrosine ethyl ester had no effect i.e., the rats did not start to rotate. This sedating effect is caused by the depletion of noradrenaline and dopamine by these esters of α-methyl-p-tyrosine. Esters of the natural amino acid L-tyrosine are inactive in all tests described.

The following experiments show the potentiating synergistic effect which is obtained by the combination of compound II or III with an ester of dl-m-tyrosine or L-m-tyrosine.

EXAMPLE 12

Blockade of reserpine induced katatonia

In a first series, mice were injected intraperitoneally with 5 mg of reserpine per kilo body weight in order to get the blockade of reserpine induced katatonia. This induced a syndrome characterized mainly by rigidity, akinesia in the muscles and katatonia, which symptoms resemble those seen clinically in Parkinson's disease.

Then by administering intraperitoneally 300 to 400 mg per kg body weight of e.g. L-m-tyrosine ethylester, this katatonia is reversed and the animals move and look normally again.

By intraperitoneal pretreatment of the mice 30 minutes before the injection of L-m-tyrosine ethylester with 25 to 100 mg per kg body weight of compound II or with 10 to 125 mg per kg body weight of compound III, the blockade of the reserpine induced katatonia was reversed with 50 to 100 mg per kg body weight of L-m-tyrosine ethylester given intraperitoneally. When the compounds II or III were administered simultaneously with the L-m-tyrosine ethyl ester, the same results were obtained.

EXAMPLE 13

Rotation induced in rats with unilateral lesion in the nigroneostriatel dopamine neurons Male rats (Sprague Dawley) were injected unilaterally in the substantia nigra with 6-hydroxydopamine, as described in Example 11.

Pretreatment of these animals with compound II or III potentiates the effects of esters of Dl- or L-m-tyrosine as it is shown in Table 1 below.

Alone neither compound II or compound III in doses 600 mg per kg i.p. shows any effect in this test. When L-m-tyrosine ethylester was administered simultaneously with the compounds II or III, the same results were obtained.

The other esters of L-m-tyrosine are similarly potentiated by compounds II or III. As the esters of D-m-tyrosine are not active as anti-parkinson agents, the same degree of potentiation is obtained when 100 mg per kg i.p. is given of the ester of dl-m-tyrosine.

The following are examples of pharmaceutical preparations employing the compounds of the present invention:

EXAMPLE 14

A syrup containing 5% (weight per volume) of the active substance can be produced from the following ingredients:

| | |
|---|---|
| L-m-tyrosine ethylester hydrochloride | 5.0 g |
| Saccharine | 0.6 g |
| Sugar | 30.0 g |
| Glycerol | 5.0 g |
| Flavoring agent | 0.1 g |
| Ethanol 96% | 10.0 ml |
| Distilled water | to 100.0 ml |

The sugar, saccharine and the ether salt were dissolved in 60 grams of hot water. After cooling, the glycerol was added and a solution of the flavoring agent in ethanol was added. The mixture was then made up to a volume of 100 milliliters with water.

The active substance shown above may be replaced by other pharmaceutically acceptable acid addition salts.

EXAMPLE 15

A syrup containing 1% (weight per volume) of the active substance as well as the potentiating substance was produced from the following ingredients:

| | |
|---|---|
| L-m-tyrosine ethylester hydrochloride | 1.0 g |
| 3,4-dihydroxyphenyl-α-methyl-α--hydrazino-propionic acid | 1.0 g |
| Saccharine | 0.6 g |

-Continued

| | |
|---|---|
| Sugar | 30.0 g |
| Glycerol | 5.0 g |
| Flavoring agent | 0.1 g |
| Ethanol 96% | 10.0 ml |
| Distilled water | to 100.0 ml |

The sugar, saccharine, and the ether salt were dissolved in 60 grams of hot water. After cooling, the glycerol was added and a solution of the flavoring agent in ethanol was added. The mixture was then made up to a volume of 100 milliliters with water.

The active substance shown above may be replaced by other pharmaceutically acceptable acid addition salts.

EXAMPLE 16

L-m-tyrosine ethylester hydrochloride (1,000 g) and 3,4-dihydroxyphenyl-α-methyl-α-hydrazino propionic acid (1500 g) mixed with lactose (750 g), potato starch (740 g) and colloidal silica (100 g). The mixture was moistened with a 10% gelatine solution and granulated through a 12 mesh sieve. After drying, potato starch (700 g) talc (200 g) and magnesium stearate (10 g) were mixed in and the resulting mixture was pressed into tablets (10,000) containing 100 milligrams of active substance which were suitable for use as tablets. The tablets were marked with break lines to enable a dose other than 100 milligrams or multiples thereof to be administered.

EXAMPLE 17

A granulate was prepared from dl-m-tyrosine ethylester hydrochloride (5,000 g) N'-seryl-N -(2,3,4-trihydroxybenzyl) hydrazine (1,000 g), lactose (1,200 g) and an alcoholic solution of polyvinyl pyrrolidone (200 g). After drying, the granulate was mixed with talc (200 g), potato starch (300 g) and magnesium stearate (10 g) and pressed into 20,000 biconvex tablets. These tablets were first coated with a 10% alcoholic shellac solution then with a water solution containing saccharose (45%), gum arabic (5%), gelatine (4%) and dyestuff (0.2%). Talc and sugar powder were used as dusting powders after the first 15 applications. The coating was then finished with a 66% sugar syrup and polished with a 10% Carnauba wax solution in carbon tetrachloride.

EXAMPLE 18

L-m-tyrosine ethylester hydrochloride (10 g) and N -seryl-N (2,3,4-trihydroxybenzyl)hydrazine (10 g), sodium chloride (0.8 g) and ascorbic acid (0.1 g) were dissolved in sufficient distilled water to make 100 milliliters of solution. This solution, each milliliter of which contained 100 milligrams of the active substance, was used to fill ampoules which were sterilized by heating for 20 minutes at 120° C.

We claim:

1. A method for mitigating symptoms of Parkinson's disease, comprising administering to a subject having the symptoms thereof, a therapeutically active amount of a compound of the formula

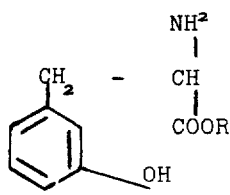

I in which R denotes a lower, straight or branched alkyl group having one to three carbon atoms either as a racemate or as an optically active L-form as such or in the form of a salt of a pharmaceutically acceptable acid.

2. Method according to claim 1, wherein dl-m-tyrosine ethyl ester or a pharmaceutically acceptable salt thereof is administered.

3. Method according to claim 1, wherein a therapeutically active amount of L-m-tyrosine ethyl ester or a pharmaceutically acceptable salt thereof is administered.

4. Method according to claim 1, wherein said compound I is administered to said subject in a dosage rate between 0.5 and 2.0 grams per day of the L-form thereof, and together therewith there is further administered a compound selected from the group consisting of 3,4-dihydroxyphenyl-α-methyl-α-hydrazinopropionic acid having the formula:

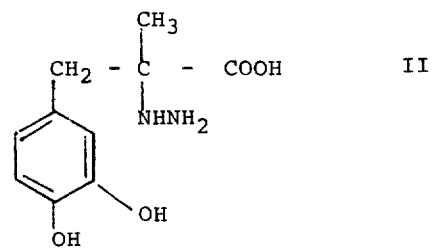

II or N¹-seryl-N²-(2,3,4-trihydroxybenzyl)-hydrazine having the formula:

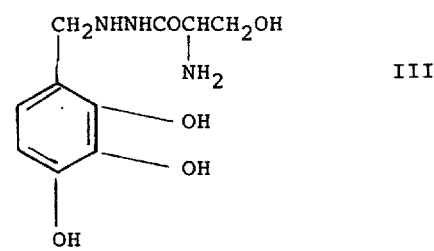

III the amount of said compounds II and III being between 0.10 to 2.0 grams per day and being sufficient to potentiate the effectiveness of said compound I, and said compounds II and III being administered between from 0 to 6 hours prior to administration of said compound I.

5. In a method according to claim 4, wherein compound II is administered, one amount thereof being between 0.75 and 1.5 grams per day, and being sufficient to potentiate the effectiveness of said ester.

6. In a method according to claim 4, wherein compound III is administered, the amount thereof being between 0.2 and 1.0 grams per day and being sufficient to potentiate the effectiveness of said ester.

7. In a method according to claim 4 wherein the amount of the tyrosine ester of the pure L-form is between 0.5 and 1.0 grams per day.

8. A pharmaceutical composition for alleviating symptoms of Parkinson's disease for oral administration containing as an active ingredient a compound of the formula

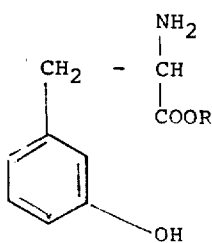

or a pharmaceutically acceptable salt thereof, in therapeutically effective amount, in which R denotes a lower, straight or branched alkyl group having one to three carbon atoms, together with a pharmaceutical carrier.

9. A composition according to claim 8, containing as an active ingredient dl-m-tyrosine ethyl ester or a pharmaceutically acceptable salt thereof.

10. A composition according to claim 8, containing as an active ingredient L-m-tyrosine ethyl ester or a pharmaceutically acceptable salt thereof.

11. A composition according to claim 8, containing as an active ingredient dl-m-tyrosine methyl ester or a pharmaceutically acceptable salt thereof.

12. A composition according to claim 8, containing as an active ingredient L-m-tyrosine methyl ester or a pharmaceutically acceptable salt thereof.

13. A composition according to claim 8, in the form of tablets or syrups.

14. A pharmaceutical composition for alleviating symptoms of Parkinson's disease for rectal administration containing as an active ingredient a compound of the formula

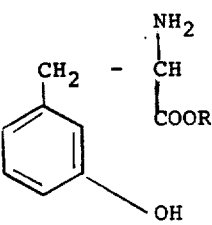

or a pharmaceutically acceptable salt thereof, in therapeutically effective amount, in which R denotes a lower, straight or branched alkyl group having one to three carbon atoms, together with a pharmaceutical carrier.

15. A composition according to claim 14, containing as an active ingredient dl-m-tyrosine ethyl ester or a pharmaceutically acceptable salt thereof.

16. A composition according to claim 14, containing as an active ingredient L-m-tyrosine ethyl ester or a pharmaceutically acceptable salt thereof.

17. A composition according to claim 14, containing as an active ingredient dl-m-tyrosine methyl ester or a pharmaceutically acceptable salt thereof.

18. A composition according to claim 14, containing as an active ingredient L-m-tyrosine methyl ester or a pharmaceutically acceptable salt thereof.

19. A composition according to claim 14, in the form of suppositories.

20. A pharmaceutical composition for alleviating symptoms of Parkinson's disease for parenteral administration containing as an active ingredient a compound of the formula

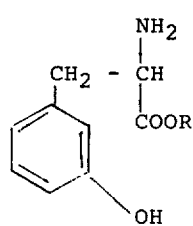

or a pharmaceutically acceptable salt thereof, in therapeutically effective amount, in which R denotes a lower, straight or branched alkyl group having one to three carbon atoms, together with a pharmaceutical carrier.

21. A composition according to claim 20, containing as an active ingredient dl-m-tyrosine ethyl ester or a pharmaceutically acceptable salt thereof.

22. A composition according to claim 20, containing as an active ingredient L-m-tyrosine ethyl ester or a pharmaceutically acceptable salt thereof.

23. A composition according to claim 20, containing as an active ingredient dl-m-tyrosine methyl ester or a pharmaceutically acceptable salt thereof.

24. A composition according to claim 20, containing as an active ingredient L-m-tyrosine methyl ester or a pharmaceutically acceptable salt thereof.

25. A composition according to claim 20, in the form of solutions for injection.

26. A pharmaceutical composition for alleviating symptoms of Parkinson's disease characterized in that it contains 1 to 4 parts of the dl-form or 0.5 to 2 parts of the L-form of an ester of m-tyrosine having the formula

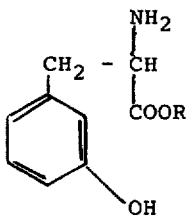

I wherein R denotes a lower, straight or branched alkyl group having one to three carbon atoms, in the form of base or salt of a pharmaceutically acceptable acid, and 0.75 to 1.5 parts of 3,4-dihydroxyphenyl-α-methyl-α-hydrazino-propionic acid having the formula

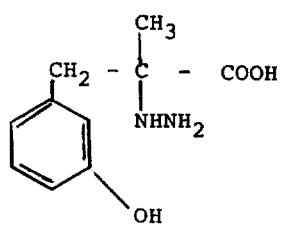

II or 0.2 to 1.0 part of N$^1$-seryl-N$^2$ (2,3,4-trihydroxybenzyl)-hydrazine having the formula

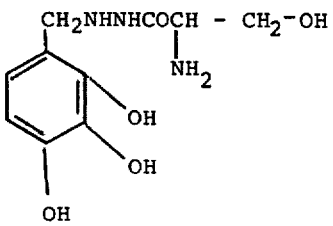

III

27. Pharmaceutical composition according to claim 26, characterized in that it contains L-m-tyrosine ethylester and 3,4-dihydroxyphenyl-α-methyl-α-hydrazino-propionic acid.

28. Pharmaceutical composition according to claim 26, characterized in that it contains L-m-tyrosine ethylester and $N^1$-seryl-$N^2$-(2,3,4-trihydroxybenzyl)-hydrazine.

29. Pharmaceutical composition according to claim 26, characterized thereby that it is in the form of a tablet containing 50 to 300 mg of L-m-tyrosine ethylester and 50 to 500 mg of 3,4-dihydroxyphenyl-α-methyl-α-hydrazino-propionic acid or 50 to 300 mg of L-m-tyrosine ethylester and 50 to 300 mg of $N^1$-seryl-$N^2$-(2,3,4-trihydroxybenzyl)-hydrazine.

* * * * *

UNITED STATES PATENT AND TRADEMARK OFFICE
CERTIFICATE OF CORRECTION

PATENT NO. : 3,891,768

DATED : June 24, 1975

INVENTOR(S) : Per Arvid Emil Carlsson et al

It is certified that error appears in the above-identified patent and that said Letters Patent are hereby corrected as shown below:

Front page, Item [63] should be amended as follows:
--Continuation-in-part of Ser. No. 387,370, Aug. 10, 1973, abandoned, which is a continuation of Ser. No. 122,535, Mar. 9, 1971, abandoned, and Ser. No. 190,682, Oct. 19, 1971, abandoned.--;

Front page, insert the following Item after Item [63]:
--[30]      FOREIGN APPLICATION PRIORITY DATA
     March 10, 1970      Sweden............3,142/70
     November 9, 1970    Sweden...........15,129/70--;

Front page, Item [57], second sentence, after "itself" insert --or--, change "s,4-dihydroxyphenyl" to --3,4-dihydroxyphenyl--;

Col. 1, line 5, following "respectively" add,
--Application Ser. No. 387,370 was, in turn, a continuation of application Ser. No. 122,535 filed March 9, 1971, now abandoned.--;

Col. 9, lines 63-69, formula I of claim 1 reading

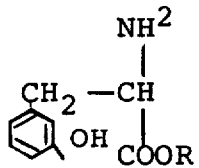     should read     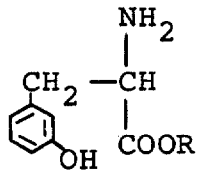

Col. 12, lines 55-57, that portion of formula II of claim 26 reading      should read     

Signed and Sealed this

Seventeenth Day of August 1976

[SEAL]

Attest:

RUTH C. MASON
Attesting Officer

C. MARSHALL DANN
Commissioner of Patents and Trademarks